C. C. MEHLER.
CULTIVATOR.
APPLICATION FILED AUG. 12, 1910.
975,058.
Patented Nov. 8, 1910.
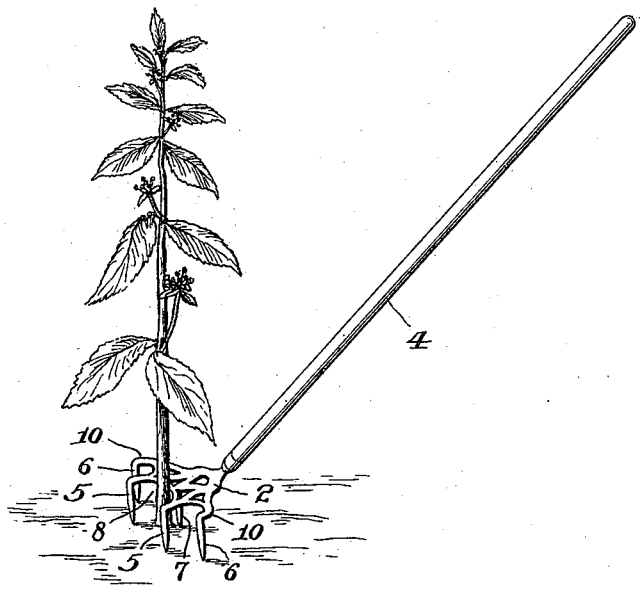
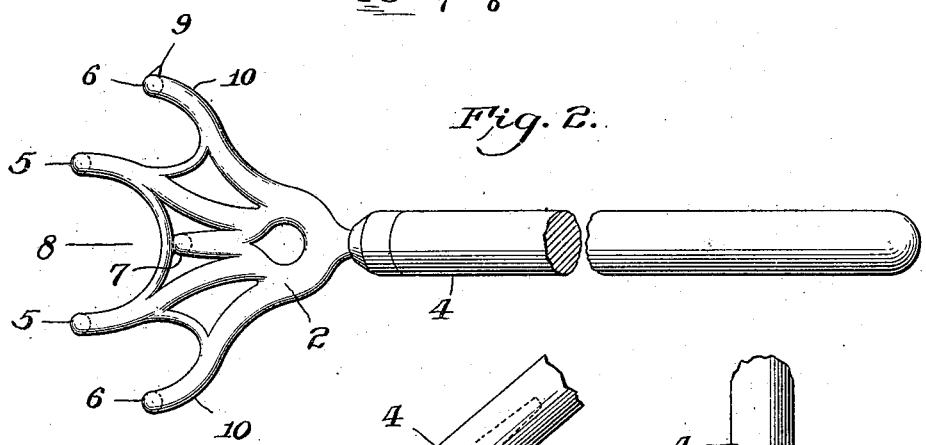
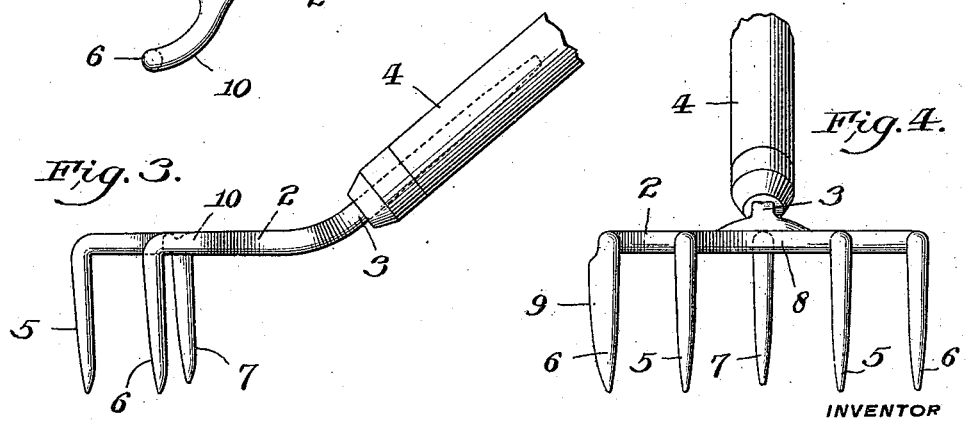
WITNESSES
INVENTOR
Charles C. Mehler
BY
ATTORNEY

UNITED STATES PATENT OFFICE.

CHARLES C. MEHLER, OF AMBLER, PENNSYLVANIA.

CULTIVATOR.

975,058.　　　　　　Specification of Letters Patent.　　Patented Nov. 8, 1910.

Application filed August 12, 1910. Serial No. 576,904.

*To all whom it may concern:*

Be it known that I, CHARLES C. MEHLER, a citizen of the United States, residing at Ambler, Montgomery county, State of Pennsylvania, have invented certain new and useful Improvements in Cultivators, of which the following is a specification.

The object of my invention is to provide a novel, simple and efficient cultivator for growing plants; and to this end the invention, as generally stated, comprises a substantially horizontally-arranged body portion provided with an upwardly inclined handle extending from one end thereof, and provided also with downwardly extending tines arranged in a novel manner relatively to each other and to the body portion, whereby practically all of the ground around a growing plant may be properly cultivated from a position on one side of the plant.

The invention includes various novel features of construction, all of which will be hereinafter fully described and particularly claimed.

In the drawings:—Figure 1 is a perspective view of my improved cultivator, showing one position thereof relatively to a growing plant. Fig. 2 is a plan view of the cultivator. Fig. 3 is a side elevation thereof. Fig. 4 is a front elevation thereof.

2 designates a substantially horizontally-arranged, skeleton-like body portion. Extending from the rearward end of the body portion 2 is an upwardly and rearwardly inclined arm 3, which extends into the lower end of an upwardly and rearwardly inclined handle 4, the arm 3 being secured in place within the handle 4. The body portion 2 is provided with a pair of forward tines 5, 5, a pair of outward tines 6, 6, and a centrally-arranged tine 7. The tines 5, 6, and 7 all extend downwardly from the body portion 2; and the tines 5, 6, and 7, body portion 2 and arm 3 are made integral with each other and formed of a single casting. The pair of tines 5, 5, are arranged forwardly of the central tine 7, one tine 5 being arranged on one side of the center of the body portion 2, and the other tine 5 being arranged on the other side of the center of the body portion 2. The body portion 2 is provided with a rearwardly extending opening 8 between the tines 5, 5, the rearward wall of the opening 8 being forwardly of the central tine 7, and forming a guard therefor for a purpose hereinafter explained. The tines 6, 6, are arranged outwardly and rearwardly of the pair of tines 5, 5, one tine 6 extending from one side of the body portion 2, and the other tine 6 extending from the other side of the body portion 2; and the central tine 7 is made slightly shorter than the other tines 5, 5, and 6, 6. One of the outer tines 6 is provided with an outward extension 9, having an outer knife-edge, for a purpose hereinafter explained. The side faces 10, 10, of the body portion 2 extend rearwardly from the outer portions of the tines 6, 6, and the faces 10, 10, are then curved inwardly, as shown, forming guards for the tines 6, 6.

From the construction hereinbefore described, it will be seen that the cultivator may be placed in the relation to a growing plant, shown in Fig. 1, with the plant extending through the opening 8, the tines 5, 5, located forwardly of the plant, the tines 6, 6, located laterally of the plant, and the tine 7 located rearwardly of the plant. In this position of the parts, the tines 5, 6 and 7, may be dug into the ground, and the cultivator drawn rearwardly by the operator, and then moved forwardly in a direct line, or as the cultivator is being moved forwardly and rearwardly, it may also be moved through a curved path around a portion of the plant, causing the tines 5, 5, to cultivate the ground on the side of the plant opposite to the operator, while the remaining tines cultivate the other sides of the plant. In addition to the operation just described, the entire body portion 2, and all the tines 5, 6, and 7, may be moved forwardly on one side of the plant and then rearwardly and between the plant and the operator and then forwardly on the other side of the plant. In other words, the entire body portion 2 may be moved through a curved path almost entirely around the plant and back again. During these various movements of the cultivator, the slender tines 5, 6, and 7, may be caused to act upon the ground in a manner to thoroughly cultivate the ground around the entire plant without plowing the ground away from the plant while the operator may remain practically in a single position on one side of the plant.

The purpose of making the tine 7 slightly shorter than the other tines is, that when the tine 7 is close to the body of the plant, as shown in Fig. 1, and the tines of the cultivator are dug into the ground, in drawing it rearwardly, the tines 5, 5, and 6, 6, will enter the ground during the rearward movement of the cultivator slightly before the tine 7 enters the ground, thereby avoiding any liability of the tine 7 attacking the roots of the plant by entering the ground in close relation thereto.

During the cultivating operation, the rearward wall of the opening 8 of the body portion 2, forms a guard to prevent the tine 7 from being placed too close to the plant; and the arrangement of the side faces 10 of the body portion 2 provides guards to prevent the tines 6, 6, from catching the plant during the rearward movement of the cultivator, when all the tines are located on one side of the plant.

The purpose of providing the knife-like projection 9 is to permit the operator to turn the cultivator to one side and use the knife-like projection for cutting weeds, etc.

I claim:—

1. A cultivator for plants comprising a substantially horizontally-arranged body portion; a handle inclined upwardly from the rearward end of the body portion; a central tine extending downwardly from the body portion; a pair of tines extending downwardly from the body portion, one on one side and one on the other side thereof and forwardly of said central tine; said body portion having a rearwardly-extending opening between the tines of said pair; and outer tines extending downwardly from said body portion outwardly and rearwardly of said pair of tines.

2. A cultivator for plants comprising a substantially horizontally-arranged body portion; a handle inclined upwardly from the rearward end of the body portion; a central tine extending downwardly from the body portion; a pair of tines extending downwardly from the body portion, one on one side and one on the other side thereof and forwardly of said central tine; said body portion having a rearwardly-extending opening between the tines of said pair; and said body portion forming a guard for said central tine forwardly thereof; and outer tines extending downwardly from said body portion outwardly and rearwardly of said pair of tines.

3. A cultivator for plants comprising a substantially horizontally-arranged body portion; a handle inclined upwardly from the rearward end of the body portion; a central tine extending downwardly from the body portion; a pair of tines extending downwardly from the body portion, one on one side and one on the other side thereof and forwardly of said central tine; said body portion having a rearwardly-extending opening between the tines of said pair; and outer tines extending downwardly from said body portion outwardly and rearwardly of said pair of tines; the side faces of said body portion extending rearwardly from the outer portions of said outer tines and curved inwardly.

4. A cultivator for plants comprising a substantially horizontally-arranged body portion; a handle inclined upwardly from the rearward end of the body portion; a central tine extending downwardly from the body portion; a pair of tines extending downwardly from the body portion, one on one side and one on the other side thereof and forwardly of said central tine; said body portion having a rearwardly-extending opening between the tines of said pair; and said body portion forming a guard for said central tine forwardly thereof; and outer tines extending downwardly from said body portion outwardly and rearwardly of said pair of tines; the side faces of said body portion extending rearwardly from the outer portions of said outer tines and curved inwardly.

5. A cultivator for plants comprising a substantially horizontally-arranged body portion; a handle inclined upwardly from the rearward end of the body portion; a central tine extending downwardly from the body portion; a pair of tines extending downwardly from the body portion, one on one side and one on the other side thereof and forwardly of said central tine; said body portion having a rearwardly-extending opening between the tines of said pair; and outer tines extending downwardly from said body portion outwardly and rearwardly of said pair of tines; said central tine being shorter than the other tines.

In testimony whereof I affix my signature in the presence of two witnesses.

CHARLES C. MEHLER.

Witnesses:
 THOMAS ATKINSON,
 HAROLD G. KNIGHT.